United States Patent
Kim et al.

(10) Patent No.: US 9,170,478 B2
(45) Date of Patent: Oct. 27, 2015

(54) DISPLAY SCREEN OF IMAGE DISPLAY SYSTEM AND METHOD FOR MANUFACTURING THE SAME

(71) Applicant: LG ELECTRONICS INC., Seoul (KR)

(72) Inventors: Sungtae Kim, Seoul (KR); Byunggil Ryu, Seoul (KR); Wonki Cho, Seongnam-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/370,425

(22) PCT Filed: Dec. 4, 2012

(86) PCT No.: PCT/KR2012/010418
§ 371 (c)(1),
(2) Date: Jul. 2, 2014

(87) PCT Pub. No.: WO2013/108990
PCT Pub. Date: Jul. 25, 2013

(65) Prior Publication Data
US 2014/0368906 A1    Dec. 18, 2014

(30) Foreign Application Priority Data
Jan. 18, 2012 (KR) .................. 10-2012-0005791

(51) Int. Cl.
*G03B 21/60* (2014.01)
*G02B 5/02* (2006.01)
*G03B 35/26* (2006.01)
*B05B 5/06* (2006.01)

(52) U.S. Cl.
CPC . *G03B 21/60* (2013.01); *B05B 5/06* (2013.01); *G02B 5/0294* (2013.01); *G03B 35/26* (2013.01)

(58) Field of Classification Search
CPC ...................................................... G03B 21/602
USPC ......................................... 359/449, 457, 459
See application file for complete search history.

(56) References Cited

U.S. PATENT DOCUMENTS

| | | | | |
|---|---|---|---|---|
| 3,893,748 A * | 7/1975 | De Palma et al. | | 359/455 |
| 6,023,369 A * | 2/2000 | Goto | | 359/443 |
| 6,144,491 A * | 11/2000 | Orikasa et al. | | 359/452 |
| 7,139,123 B2 * | 11/2006 | Chubachi et al. | | 359/449 |
| 7,561,330 B2 * | 7/2009 | Goto | | 359/459 |
| 7,649,687 B2 * | 1/2010 | Shimoda et al. | | 359/449 |
| 8,068,277 B2 * | 11/2011 | Park | | 359/452 |
| 2006/0221021 A1 | 10/2006 | Hajjar et al. | | |
| 2007/0146842 A1 | 6/2007 | Fan et al. | | |
| 2008/0297895 A1 * | 12/2008 | Fujita et al. | | 359/459 |
| 2009/0027632 A1 | 1/2009 | Choi | | |
| 2011/0151208 A1 | 6/2011 | Huang et al. | | |
| 2012/0274910 A1 * | 11/2012 | Kim et al. | | 353/79 |

* cited by examiner

*Primary Examiner* — Christopher Mahoney
(74) *Attorney, Agent, or Firm* — Birch, Stewart, Kolasch & Birch, LLP

(57) ABSTRACT

Disclosed are a display screen of an image display system capable of displaying a 3D (three-dimensional) image and providing an image with a high contrast ratio in a bright room and a method for manufacturing the same. The display screen includes: a Fresnel lens layer; a reflective layer formed the light-exit surface of the Fresnel lens layer to reflect image light; and a protection layer formed on the light-incident surface of the Fresnel lens layer, wherein one surface of the protection layer may have an embossed pattern.

22 Claims, 5 Drawing Sheets

LIGHT FROM PROJECTOR
(IMAGE LIGHT)

LIGHT FROM PROJECTOR
(IMAGE LIGHT)

LIGHT FROM PROJECTOR
(IMAGE LIGHT)

DISPLAY SCREEN OF IMAGE DISPLAY SYSTEM AND METHOD FOR MANUFACTURING THE SAME

TECHNICAL FIELD

The present invention relates to a display screen of an image display system and a method for manufacturing the same.

BACKGROUND ART

In general, a display screen of an image display system according to the prior art displays image light incident from a projector.

DISCLOSURE OF INVENTION

Solution to Problem

Therefore, an object of the present invention is to provide a display screen of an image display system capable of displaying a 3D (three-dimensional) image and providing an image with a high contrast ratio in a bright room and a method for manufacturing the same.

To achieve these and other advantages and in accordance with the purpose of the present invention, as embodied and broadly described herein, there is provided a display screen according to an embodiment disclosed in the present specification includes: a Fresnel lens layer; a reflective layer formed the light-exit surface of the Fresnel lens layer to reflect image light; and a protection layer formed on the light-incident surface of the Fresnel lens layer, wherein one surface of the protection layer may have an embossed pattern.

In an example of this specification, the protection layer may include one of PMMA (polymethyl methacrylate), PVA (polyvinyl acetate), COP (cyclo polyolefin), COC (cyclo olefin copolymer), TAC (triacetyl cellulose), and PC (polycarbonate).

In an example of this specification, the display screen may further include a primer formed between the light-incident surface of the Fresnel lens layer and the protection layer.

In an example of this specification, the protection layer may include a black pigment.

In an example of this specification, the black pigment may be carbon black, and the content of the carbon black may be 0.1 to 5% by weight.

In an example of this specification, the Fresnel lens layer may include a black material.

A method for manufacturing a display screen according to an embodiment disclosed in the present specification includes the steps of: forming a reflective layer on the light-exiting surface of a Fresnel lens layer to reflect image light incident from a projector; forming a protection layer on the light-incident surface of the Fresnel lens layer; and forming an embossed pattern on one surface of the protection layer.

A display screen of an image display system and a method for manufacturing the same according to embodiments of the present invention can display a 3D image by reducing the phase difference between a lens layer and a protection layer (or base layer).

The display screen of an image display system and the method for manufacturing the same according to the embodiments of the present invention can provide an image with a high contrast ratio in a bright room by improving the contrast ratio in the bright room by the use of a black material (e.g., carbon black) included in the protection layer or lens layer.

BEST MODE FOR CARRYING OUT THE INVENTION

Figure 1:
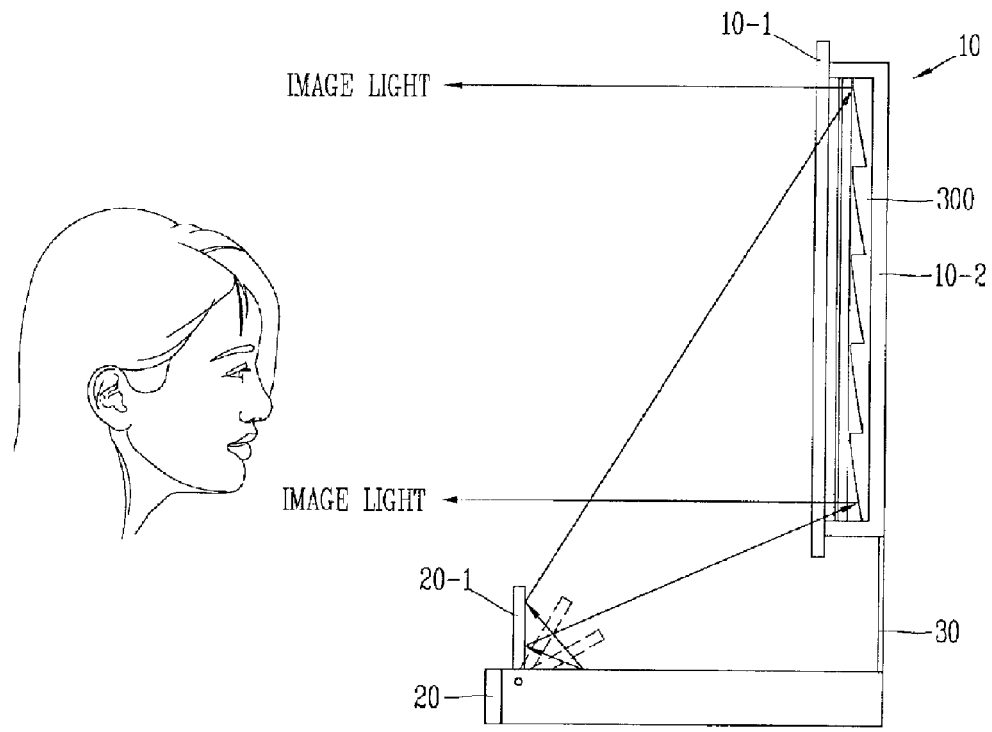
FIG. 1 is a view showing an example of an image display system to which a display screen according to embodiments of the present invention is applied.

The technical terms in the description of the present invention are used for explaining particular embodiments and it should be understood that they do not limit the present invention. Unless otherwise defined, all terms used herein have the same meanings as those generally understood by those with ordinary knowledge in the field of art to which the present invention pertains. Such terms as those defined in a generally used dictionary are to be interpreted to have the meanings equal to the contextual meanings in the relevant field of art, and are not to be interpreted to have ideal or excessively formal meanings unless clearly defined in the present application. Also, if a technical term used in the description of the present invention is an erroneous term that fails to clearly express the idea of the present invention, it should be replaced by a technical term that can be properly understood by the skilled person in the art. In addition, general term used in the description of the present invention should be construed according to definitions in dictionaries or according to its front or rear context, and should not be construed to have an excessively restrained meaning.

A singular representation may include a plural representation as far as it represents a definitely different meaning from the context. Terms include or has used herein should be understood that they are intended to indicate an existence of several components or several steps, disclosed in the specification, and it may also be understood that part of the components or steps may not be included or additional components or steps may further be included.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

Preferred embodiments of the present invention will be described below in detail with reference to the accompanying drawings, where those components are rendered the same reference number that are the same or are in correspondence, regardless of the figure number, and redundant explanations are omitted.

In describing the present invention, if a detailed explanation for a related known function or construction is considered to unnecessarily divert the gist of the present invention, such explanation has been omitted but would be understood by those skilled in the art. The accompanying drawings are used to help easily understood the technical idea of the present invention and it should be understood that the idea of the present invention is not limited by the accompanying drawings.

Hereinafter, a display screen of an image display system (e.g., projector) capable of displaying a 3D image and providing an image with a high contrast ratio in a bright room and a method for manufacturing the same will be described with reference to FIGS. 1 to 9.

FIG. 1 is a view showing an example of an image display system to which a display screen according to embodiments of the present invention is applied.

As shown in FIG. 1, the image display to which the display screen of the embodiments of the present invention is applied includes: a projector 20 including an optical system, a broadcast receiver, an external input receiver, a speaker, and input means; a reflection unit 20-1 that is located on the projector 20 and changes the path of light emitted from the projector 20; a display unit 10 that displays the light reflected by the reflection unit 20-1; and a supporting unit 30 that fixedly supports the display unit 10 and the projector 20. The display unit 10 includes a rear housing (or rear cover) 10-2 enclosing the sides and rear of the display screen 300 according to the embodiments of the present invention; and a transparent glass member (e.g., transparent strengthened glass) 10-2 covering the front of the display screen 30 to protect the front of the display screen 300.

The rear housing (or rear cover) 10-2 may be formed of an opaque material, and the glass member (e.g., strengthened glass) 10-1 may be bonded and fixed to the rear housing 10-2.

The reflection unit 20-1 changes the path of the light emitted from the optical system in the projector so that the emitted light is reflected and magnified and projected on the display screen. When the projector 20 is turned on, the reflection unit 20-1 may be rotated and unfolded (developed) by the rotating force of a motor (not shown), and when the projector 20 is turned off, the reflection unit 20-1 may be rotated by the rotating force of the motor (not shown) and folded in the direction of the projector 20.

The projector is a front-projection type image system which is located at the front bottom of the display unit 10 and allows emitted image light to be slantly incident in the direction of the bottom of the display unit 10, reflected on the display screen 300 of the display unit 10, and output to the front where the user looks from.

A description of the reflection unit 20-1 is disclosed in U.S. Patent Laid-Open Publication No. U.S. 2009/0122274, so a detailed description thereof will be omitted.

Figure 2:
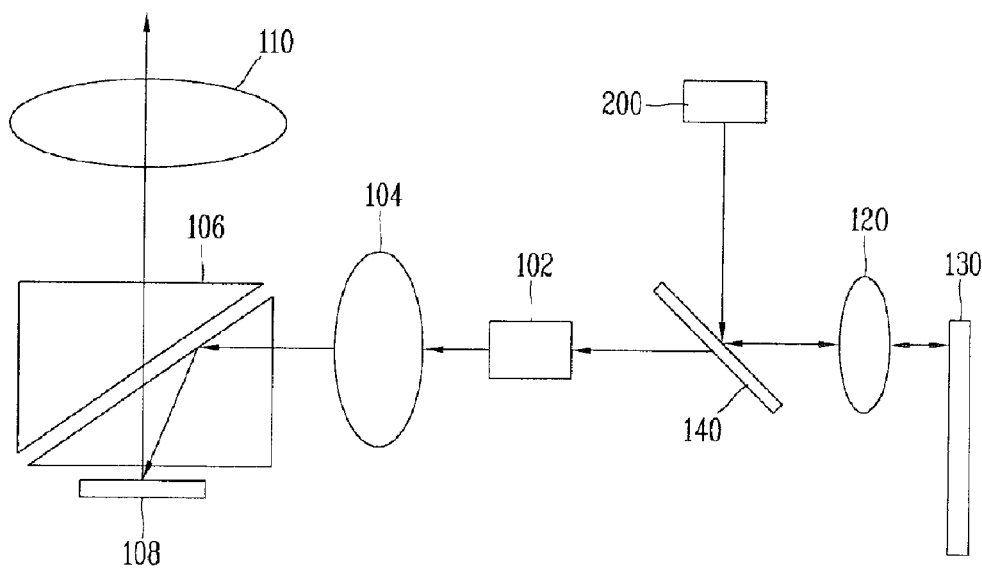
FIG. 2 is a schematic view showing the configuration of an exemplary projector to which the display screen according to the embodiments of the present invention is applied.

FIG. 2 is a schematic view showing the configuration of an exemplary projector to which the display screen according to the embodiments of the present invention is applied.

As shown in FIG. 2, the exemplary projector to which the display screen according to the embodiments of the present invention is applied includes: a light source array 200 including a plurality of light sources; an optical system (e.g., focusing optical system) 120; a color wheel 130 having a wavelength conversion material (e.g., phosphor); a light integrator 102; a delay optical system or collecting optical system 104; a prism 106; and a microdisplay imager 108 and a projection lens 110. The projector is disclosed in Korean Patent Laid-Open Publication 10-2010-0037646, so a detailed description thereof will be omitted.

The exemplary projector to which the display screen according to the embodiments of the present invention is applied may further include a dichroic filter 140 installed between the light source array 200 and the focusing optical system 120. The dichroic filter 140 is a material that transmits or reflects part of excitation light depending on wavelength. The dichroic filter 140 may transmit short-wavelength light and reflect long-wavelength light, or reflect short-wavelength light and transmit long-wavelength light. The dichroic filter 140 reflects the excitation light toward the optical system 120, and transmits a plurality of colored light beams produced by the color wheel 130.

The light emitted from the light source array 200 is converted into a plurality of colored light beams through the color wheel 130, and the plurality of converted light beams pass through the light integrator 102 for intensity homogenization (scrambling). The light source array 200 may include a plurality of light emitting diodes (e.g., blue LEDs), a plurality of deep blue LEDs, a plurality of UV LEDS, or a plurality of laser diodes.

The delay optical system 104 focuses light scrambled through the prism 106 on the microdisplay imager 108.

Light modulated by the microdisplay imager 108 is projected onto the display screen (e.g., reflection-type screen) 300 through the projection lens 110.

Multi-color images are obtained through synchronization between the microdisplay imager 108 and the color wheel 130 and through a signal processor (not shown) for controlling the color wheel 130 and the microdisplay imager 108.

The color wheel 130 includes each wavelength conversion material for converting excitation light of the light source array 200 into another type of wavelength for illumination (lighting). For instance, the color wheel 130 rotates (or linearly vibrates) by a motor, thereby sequentially separating colors from the excitation light to generate a plurality of colored light beams of high brightness. The color wheel 130 may apply light produced from the wavelength conversion material to the light integrator 102.

The configuration of the display screen 300 for displaying light (e.g., 2D/3D image light) incident from the image display system (e.g., projector) will now be described with reference to FIGS. 3 and 4.

Figure 3:
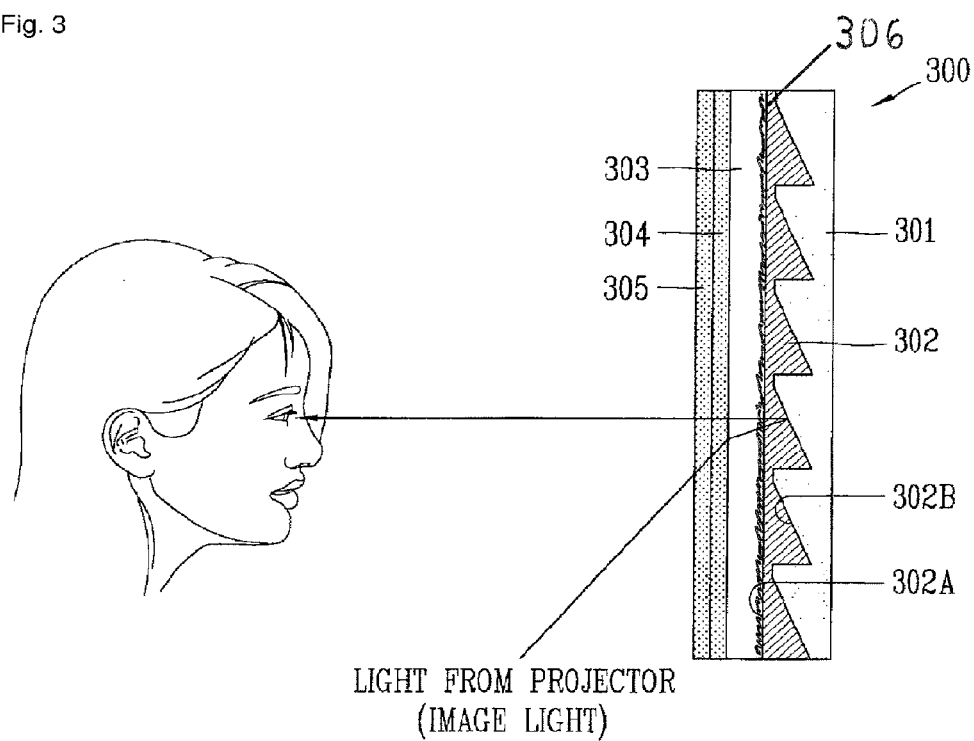
FIG. 3 is a view showing the configuration of a display screen according to a first embodiment of the present invention.

FIG. 3 is a view showing the configuration of a display screen according to a first embodiment of the present invention.

As shown in FIG. 3, the display screen 300 according to the first embodiment of the present invention includes: a lens (e.g., Fresnel lens) layer 302; a reflective layer 301 formed on a first surface of the lens layer 302; and a protection layer (or base layer) 303 formed on a second surface of the lens layer 302.

The reflective layer 301 may be formed on the light-exiting surface (e.g., first surface) 302B of the lens layer 302, and the protection layer 303 may be formed on the light-incident surface 302A (e.g., second surface) of the lens layer 302 to protect the lens layer 302.

The display screen 300 according to the first embodiment of the present invention may further include a light diffusion layer 304 formed on the protection layer 303 and a surface reflection reducing layer 305 formed on the light diffusion layer 304.

The protection layer 303 may be formed on the light-incident surface 302A of the lens layer 302, and may be a PC (polycarbonate) or PET (polyethylene terephthalate) layer. The PC or PET layer may be deposited onto the light-incident surface 302A of the lens layer 302 or attached onto the light-incident surface 302A of the lens layer 302 in the form of a film.

The light diffusion layer 304 may be formed on the protection layer 303 to improve scintillation. The light diffusion layer 304 may be a surface light scattering type resin sheet, one surface of which is roughened. The resin sheet can be made from a mold roughened by sand blasting by using a casting method or injection-molding method.

The light diffusion layer 304 may be formed of a lenticular lens.

The lens (e.g., Fresnel lens) layer 302 includes the light-incident surface 302A and the light-exiting surface 302B. The reflective layer 301 is formed on the light-existing surface 302B of the lens layer 302.

The reflective layer 301 reflects light incident on the reflective layer 301 in a predetermined direction (e.g., the viewer s direction) through the lens (e.g., Fresnel lens) layer 302 so that light incident from the projector is emitted as image light toward the user (viewer).

The reflective layer 301 may be a metal layer (e.g., aluminum (Al) layer) or a minor layer reflecting the light incident from the projector.

The reflective layer 301 may be a mirror deposition layer to be deposited onto the light-exit surface 203B of the lens (e.g., Fresnel lens) layer 302 or a minor film to be attached to the light-exit surface 302B.

The lens layer 302 may be of a linear type or circular type Fresnel lens structure. The linear type Fresnel lens structure or circular type Fresnel lens structure is disclosed in Japanese Patent Registration No. 3,341,225 or U.S. Pat. No. 6,023,369, so a detailed description thereof will be omitted.

In the display screen 300 according to the first embodiment of the present invention, it is necessary to reduce the phase difference between the lens layer 302 and the protection layer (or base layer) 303 in order to display a 3D image. For example, to display a 3D image as well as a 2D image, the reflective layer 301 specularly reflects the light incident on the reflective layer 301 to maintain polarization, and the lens layer 302, which is an anisotropic lens (e.g., Fresnel lens), causes the light to be emitted out of the display screen 300 without distorting a polarization-maintaining image source due to the spectacular reflection.

Accordingly, in order to reduce the phase difference between the lens layer 302 and the protection layer (or base layer) 303, one of PMMA (polymethyl methacrylate), PVA (polyvinyl acetate), COP (cyclo polyolefin), COC (cyclo olefin copolymer), TAC (triacetyl cellulose), and PC (polycarbonate) may be used as the protection layer (or base layer) 303.

The protection layer (or base layer) 303 may be a polycarbonate film which is coated (e.g., solvent coated) on the light-incident surface 302A (e.g., second surface) of the lens layer 302 or obtained by melt extrusion.

By attaching the polycarbonate film, which has a low molecular weight, onto the light-incident surface 302A of the lens layer 302 (e.g., second surface), the phase difference between the polycarbonate film of low molecular weight and the lens layer 302 can be reduced. A film surface treatment process and an embossed pattern formation process may be added to make the polycarbonate film have a uniform small thickness and make the phase difference constant. For instance, the phase difference can be reduced firstly by performing typical film surface treatment when forming a film made of polycarbonate by melt extrusion to provide a uniform small thickness, and the phase difference can be reduced secondly by forming an embossed pattern 306 on one surface of the surface-treated polycarbonate film. This can be confirmed by [Table 1] showing an experimental result.

TABLE 1

| Polycarbonate film | Crosstalk (%) |
| --- | --- |
| Double-sided clear film | 2.7% |
| Single-sided embossed film | 2.5% |

[Table 1] is a table showing measured values of crosstalk according to shapes of the polycarbonate film. As indicated in [Table 1], it is found that the measured value of crosstalk (of one-sided embossed film) obtained when an embossed pattern is formed on a single side(one side) of the surface-treated polycarbonate film is lower than the measured value of crosstalk of the surface-treated polycarbonate film (double-sided clear film). The lower the measured values of crosstalk, the smaller the phase difference.

The average molecular weight of the raw material polycarbonate used in the experiment is 25,000 to 35,000, or may range from 25,000 to 30,000.

By forming an embossed pattern on one side of the surface-treated polycarbonate film, it is possible to reduce stress in the surface-treated polycarbonate film with the embossed pattern, obtain a polycarbonate film with less phase difference, and reduce total reflection of light coming from the outside through the polycarbonate film with less phase difference, as compared to the surface-treated polycarbonate film (double-sided clear film). Accordingly, it is found that the crosstalk is reduced when a 3D image is displayed on the display screen 300 to which the surface-treated polycarbonate film with the embossed pattern is applied.

Figure 4:
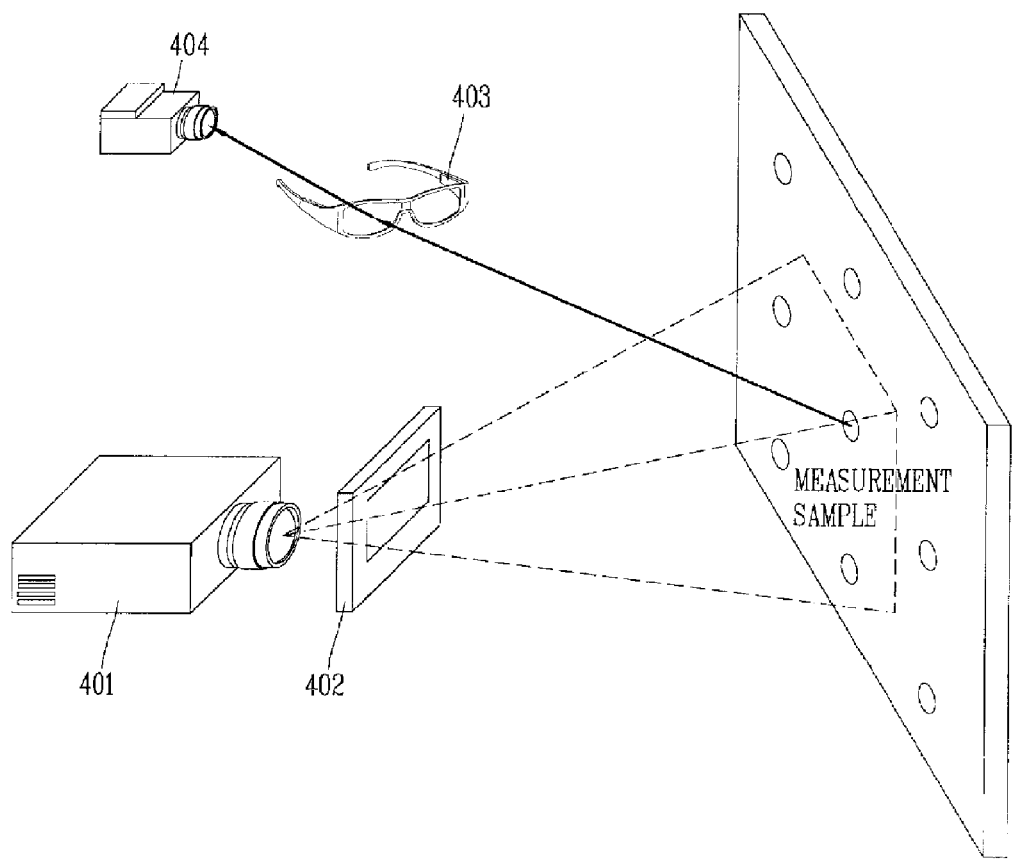
FIG. 4 is an illustration showing a process of measuring a crosstalk value according to the first embodiment of the present invention.

FIG. 4 is an illustration showing a process of measuring a crosstalk value according to the first embodiment of the present invention.

As shown in FIG. 4, a polarization filter 402 is installed at the front (i.e., ahead) of a projector 401, and light emitted from a measurement sample is measured by a luminance meter 404 with a polarization film (e.g., polarization glasses) 403 mounted thereon. A crosstalk value of the measurement sample can be obtained by subtracting a crosstalk value of the polarization film from a value of polarization crosstalk measurement. If the polycarbonate film is used as the protection layer 303, resin (e.g., ultraviolet hardening polymer resin) may be used as the material of the lens layer 302. The resin may be one of a variety of samples #1 to #5 shown in the following Table 2. Table 2 shows high-refractivity resin samples to be applied to the polycarbonate film and measured values (experimental results) of crosstalk thereof.

TABLE 2

| Resin sample | #1 | #2 | #3 | #4 | #5 |
|---|---|---|---|---|---|
| Viscosity (cPs) | 142 | 454 | 188 | 159 | 220 |
| Refractive index | 1.569 | 1.571 | 1.569 | 1.568 | 1.567 |
| density | 1.129 | 1.133 | 1.134 | 1.129 | 1.122 |
| properties | 3 Low molecular weight | 3 Low molecular weight | 10 | Fluorine/ bisphenol oligomer | Naphthalene monomer |
| Crosstalk (%) | 1.69 | 2.25 | 3.01 | 2.92 | 2.67 |

Because the refractive index of the polycarbonate film is generally 1.59, the refractive index of the resin before hardening should be around 1.57. After hardening the resin with the refractivity of 1.57, a measured refractive index of the hardened resin is around 1.59 as shown in the experimental results. That is, as the difference between the refractive index of the polycarbonate film and the refractive index of the resin (after hardening) becomes smaller, factors depending on the difference in refractive index decrease, and the phase difference value becomes smaller. Therefore, polarization can be maintained by making the refractive index of the polycarbonate film 303 equal to the refractive index of the lens layer 302. To allow the resin to have a high refractive index of 1.57 (before hardening), fluorene, bisphenol-A, and naphthalene type may be used. For example, to allow the resin to have a high refractive index of 1.57 (before hardening), a fluorene diacrylate oligomer, naphthalene monoacrylate, bisphenol-A diacrylate of 4 molecular units, etc may be used. On the other hand, if many aromatic groups are used to increase the refractive index of the resin, the hardening condition and adhesion force of the resin are weakened. Although a high-refractive index resin can be formed using sulfur or the like, the sulfur in the resin easily gets yellow after the resin is hardened.

Accordingly, a caprolactam triacrylate oligomer, hydro ethyl acrylate, hexanediol diacrylate, bisphenol-A diacrylate of 10 molecular units, etc., which are low-refractive index resins, may be used. That is, a material having the properties of a low-refractive index oligomer or photomonomer, instead of a conventional high-refractive index oligomer, may be used to form a high-refractive index resin. To obtain the material having the above properties, the photomonomer should be used in a linear form, or structural crystallinity should be avoided by decreasing the number of functional groups. In other words, it is necessary to achieve uniform hardening density and less birefringence so that a resin with less phase difference can be used.

Accordingly, the display screen according to the first embodiment of the present invention can effectively display a 3D image by reducing the phase difference between the lens layer and the protection layer.

The configuration of the display screen 300 according to a second embodiment of the present invention, which displays light (image light) incident from the projector, will now be described with reference to FIGS. 3 to 5.

Figure 5:
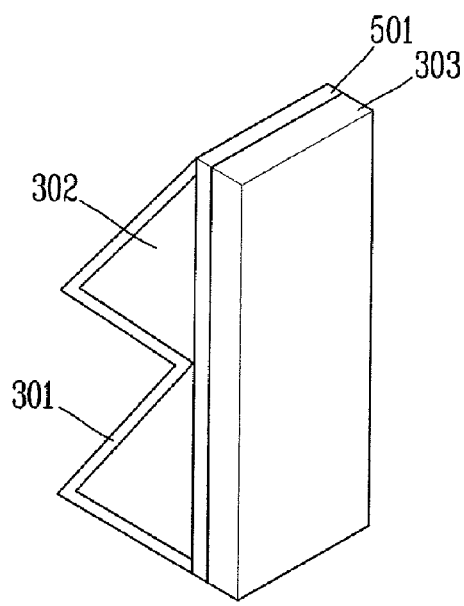
FIG. 5 is a view showing the configuration of a display screen according to a second embodiment of the present invention.

FIG. 5 is a view showing the configuration of a display screen according to a second embodiment of the present invention.

As shown in FIG. 5, the display screen 300 according to the second embodiment of the present invention may include: a lens (e.g., Fresnel lens) layer 302; a reflective layer 301 formed on a first surface of the lens layer 302; a protection layer 303 formed on a second surface of the lens layer 302; and a primer 501 formed between the lens layer 302 and the protection layer 303.

A surface-treated polycarbonate film or TAC (triacetyl cellulose) film having an embossed pattern may be used as the protection layer 303 according to the second embodiment of the present invention. The primer 501 may be used to bond the polycarbonate film or TAC (triacetyl cellulose) film and the lens layer 302. Crosstalk differs depending on the presence or absence of the primer. According to an experimental result, the phase difference of the polycarbonate film for which the primer 501 is used is smaller than the phase difference of a polycarbonate film for which the primer 501 is not used.

The thickness of the polycarbonate film applied to the display screen 300 according to the second embodiment of the present invention may be 125 microns, and the thickness of the primer 501 may be 2 microns.

When the TAC (triacetyl cellulose) film is used as the protection layer 303 according to the second embodiment of the present invention, a non-aqueous primer should be used to form the lens layer 302 because the primer 501 is fragile to moisture. Alternatively, the primer may not be used by adding an adhesive material to the resin used to form the lens layer 303.

Accordingly, the display screen according to the second embodiment of the present invention can effectively display a 3D image by applying a primer between the lens layer 302 and the protection layer so that the phase difference between the lens layer 302 and the protection layer is further reduced.

A method for reducing black luminance to display a 3D image and enable viewing in a bright room will now be described with reference to FIGS. 1 to 7.

Figure 6:
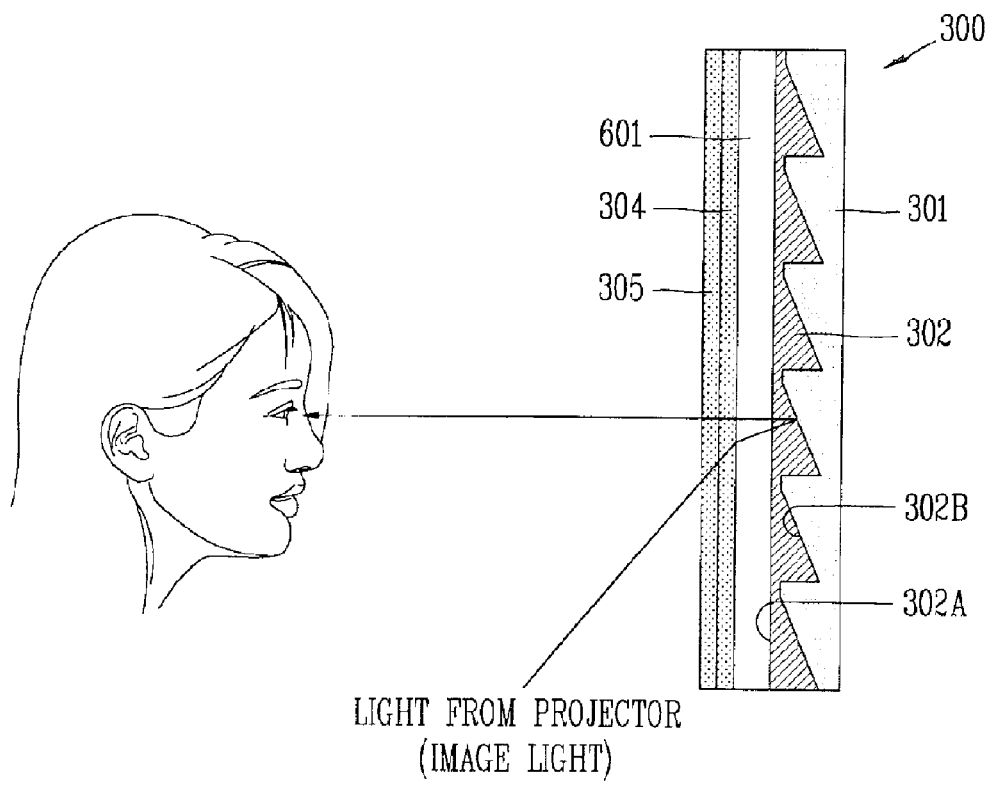
FIG. 6 is a view showing the configuration of a display screen according to a third embodiment of the present invention.

FIG. 6 is a view showing the configuration of a display screen according to a third embodiment of the present invention.

As shown in FIG. 6, the display screen 300 according to the third embodiment of the present invention may include: a lens (e.g., Fresnel lens) layer 302; a reflective layer 301 formed on a first surface of the lens layer 302; and a protection layer 601 formed on a second surface of the lens layer 302 and having a coloring agent (e.g., carbon black) added thereto.

The display screen 300 according to the third embodiment of the present invention may further include a light diffusion layer 304 formed on the protection layer 303 and a surface reflection reducing layer 305 formed on the light diffusion layer 304.

The protection layer 601 may be a polycarbonate film, and a coloring agent may be contained in the polycarbonate film to reduce the black luminance of the polycarbonate film.

The polycarbonate film can be made by mixing a coloring agent, such as a black pigment, with polycarbonate and melt-extruding the mixture. Carbon black may be used as the black pigment, and the content of the carbon black may be 0.1 to 5% by weight on the assumption that the carbon black and the polycarbonate add up to 100% by weight.

The polycarbonate film may further include an inorganic dye, an inorganic pigment, an organic dye, and an organic pigment, as well as the carbon black. If the inorganic dye, inorganic pigment, organic dye, and organic pigment are contained, along with the carbon black, in the protection layer, the content of the carbon black may be decreased.

A cobalt aluminate pigment (e.g., Co-AlO), a chromic oxide pigment (e.g., CrO), and a red hematite pigment (e.g., $\alpha$-$Fe_2O_3$) may be used as the inorganic pigment. An anthraquinone material (e.g., Red Fluorescent Dye-56) may be used as the organic pigment, and a coloring component of the organic pigment may include C.I. pigment Violet 19, 23.

Figure 7:
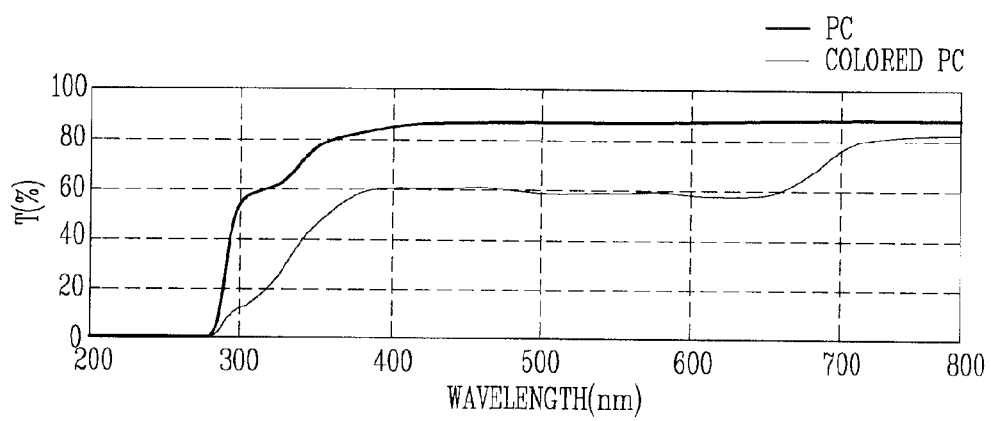
FIG. 7 is an illustration showing measurement results of the absorbance of a typical polycarbonate layer and a colored polycarbonate layer.

FIG. 7 is an illustration showing measurement results of the absorbance of a typical polycarbonate layer and a colored polycarbonate layer.

As shown in FIG. 7, the measurement results of the absorbance of a typical polycarbonate layer (PC) and a colored polycarbonate (colored PC) show that the polycarbonate film (colored PC) with a coloring agent (e.g., carbon black) added thereto does not have effect on an ultraviolet wavelength region. Thus, it is found that the polycarbonate film including the coloring agent helps to reduce black luminance.

Accordingly, the display screen according to the third embodiment of the present invention can display a 3D image and provide an image with a high contrast ratio in a bright room by adding a coloring agent to the protection layer.

A method for reducing black luminance to enable viewing in a bright room will now be described with reference to FIGS. 1 to 9.

Figure 8:
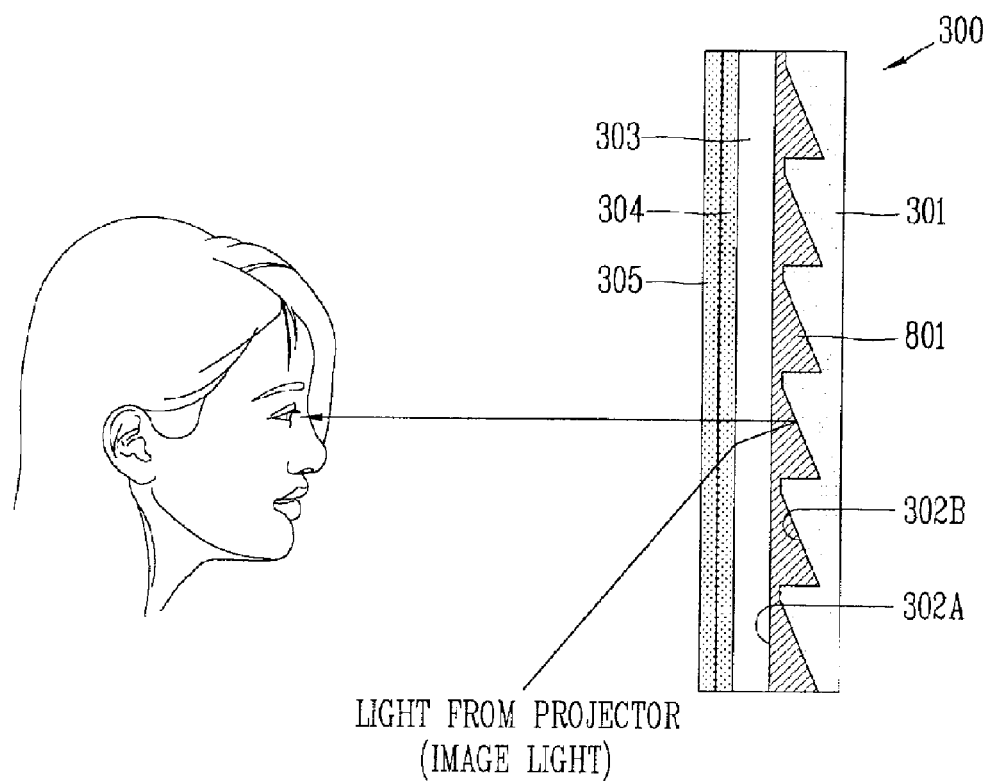
FIG. 8 is a view showing the configuration of a display screen according to a fourth embodiment of the present invention.

FIG. 8 is a view showing the configuration of a display screen according to a fourth embodiment of the present invention.

As shown in FIG. 8, the display screen 300 according to the fourth embodiment of the present invention includes: a lens (e.g., Fresnel lens) layer 801; a reflective layer 301 with a coloring agent (e.g., carbon black) added thereto; a reflection layer 301 formed on a first surface of the lens layer 801; and a protection layer 303 formed on a second surface of the lens layer 302.

The display screen 300 according to the fourth embodiment of the present invention may further include a light diffusion layer 304 formed on the protection layer 303 and a surface reflection reducing layer 305 formed on the light diffusion layer 304.

A coloring agent may be contained in the lens layer 801 to reduce the black luminance of the lens layer.

The lens layer 801 can be made by mixing a coloring agent, such as a black pigment, with resin. The content of the carbon black may be 0.1 to 5% by weight on the assumption that the carbon black and the polycarbonate add up to 100% by weight.

The lens layer 801 may further include an inorganic dye, an inorganic pigment, an organic dye, and an organic pigment, as well as the carbon black. If the inorganic dye, inorganic pigment, organic dye, and organic pigment are contained, along with the carbon black, in the lens layer 801, the content of the carbon black may be decreased.

A cobalt aluminate pigment (e.g., Co-AlO), a chromic oxide pigment (e.g., CrO), and a red hematite pigment (e.g., $\alpha$-$Fe_2O_3$) may be used as the inorganic pigment. An anthraquinone material (e.g., red fluorescent dye-56) may be used as the organic pigment, and a coloring component of the organic pigment may include C.I. pigment Violet 19, 23.

In the manufacturing of the lens layer 801 by mixing the resin and the black pigment, the process of dispersing the black pigment may be important. To improve the dispersion of the black pigment, a mill base is contained, along with the black pigment, in the resin. For example, the dispersion of the black pigment can be improved by using about 5 to 10 times larger amount of black pigment relative to the content of the black pigment. At this point, the black pigment can be dispersed by a dispersing agent, and a synergist can be used together with the dispersing agent, thereby further improving the dispersion of the black pigment.

The content of the resin may be 85 to 93% by weight, the content of the dispersing agent may be 2 to 10% by weight, the content of the black pigment may be 0.1 to 5% by weight, and the content of the synergist may be less than 3% by weight.

Moreover, when putting the resin containing the black pigment, dispersing agent, and synergist into a metal mold and hardening the resin to form the lens layer, a mold release agent may be additionally used to provide better mold release from the metal mold and the resin. The mold release agent may be silicon or the like. Because the mold release agent causes air bubbles when a mill base is produced, the black pigment may not be dispersed. Accordingly, the mill base is produced, then the mill base is diluted with the black pigment and the resin, and then the mold release agent is mixed with the diluted material.

Figure 9:
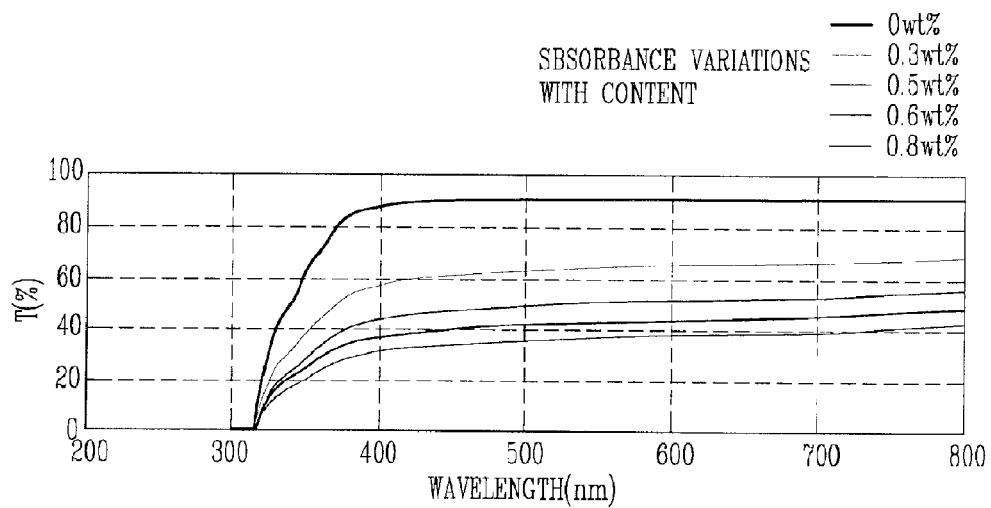
FIG. 9 is an illustration showing measurement results of the absorbance versus concentration of a black pigment in diluted mill base according to the fourth embodiment of the present invention.

FIG. 9 is an illustration showing measurement results of the absorbance versus concentration of a black pigment in diluted mill base according to the fourth embodiment of the present invention.

As shown in FIG. 9, it is found that a mill base with an ultraviolet hardening resin can be used because light is nor absorbed in an ultraviolet wavelength region. That is, ultraviolet hardening is required when a mill base is diluted and used to reduce black luminance, and light absorption must be avoided in the wavelength region of a hardening agent at the time of ultraviolet hardening. Moreover, a large amount of black pigment is required to reduce black luminance when the black pigment is applied onto the reflection layer or diffusion layer, rather than directly onto the lens layer; whereas even a small amount of black pigment is enough for black luminance control if the black pigment is directly applied onto the lens layer.

Accordingly, the display screen according to the fourth embodiment of the present invention can display a 3D image and provide an image with a high contrast ratio in a bright room by adding a coloring agent to the lens layer.

As explained above, the display screen and the method for manufacturing the same according to the embodiments of the present invention can effectively display a 3D image by applying a primer between the lens layer 302 and the protection layer so that the phase difference between the lens layer 302 and the protection layer is further reduced.

The display screen and the method for manufacturing the same according to the embodiments of the present invention can display a 3D image and provide an image with a high contrast ratio in a bright room by adding a coloring agent to the protection layer.

The display screen and the method for manufacturing the same according to the embodiments of the present invention can display a 3D image and provide an image with a high contrast ratio in a bright room by adding a coloring agent to the lens layer.

It will be appreciated by those skilled in the art that various modifications, changes, and substitutions can be made without departing from the essential characteristics of the present invention. Accordingly, the exemplary embodiments disclosed in the present invention and the accompanying drawings are used not to limit but to describe the spirit of the present invention. The scope of the present invention is not limited only to the exemplary embodiments and the accompanying drawings. The protection scope of the present invention must be analyzed by the appended claims and it should be analyzed that all spirits within a scope equivalent thereto are included in the appended claims of the present invention.

The invention claimed is:

1. A display screen comprising:
a Fresnel lens layer;
a reflective layer formed on a light-exit surface of the Fresnel lens layer to reflect image light;
a primer formed on a light-incident surface of the Fresnel lens layer;

a protection layer formed on the primer;
a light diffusion layer formed on the protection layer; and
a surface reflection reducing layer formed on the light diffusion layer,
wherein one surface of the protection layer has an embossed pattern, and the primer is formed between the light-incident surface of the Fresnel lens layer and the protection layer to bond the protection layer and the Fresnel lens layer, and
wherein the primer has a predetermined thickness less than a thickness of the protection layer and is configured to reduce a phase difference between the Fresnel lens layer and the protection layer.

2. The display screen of claim 1, wherein the image light is incident from a projector.

3. The display screen of claim 1, wherein the protection layer comprises one of PMMA (polymethyl methacrylate), PVA (polyvinyl acetate), COP (cyclo polyolefin), COC (cyclo olefin copolymer), TAC (triacetyl cellulose), and PC (polycarbonate).

4. The display screen of claim 1, wherein the protection layer includes a black pigment.

5. The display screen of claim 4, wherein the black pigment is carbon black.

6. The display screen of claim 5, wherein the content of the carbon black is 0.1 to 5% by weight.

7. The method of claim 4, wherein the black pigment is carbon black.

8. The method of claim 7, wherein the content of the carbon black is 0.1 to 5% by weight.

9. The display screen of claim 1, wherein the Fresnel lens layer includes a black material.

10. The display screen of claim 1, wherein the light diffusion layer is a lenticular lens layer.

11. The display screen of claim 1, wherein the primer is a non-aqueous primer.

12. The display screen of claim 1, wherein the light diffusion layer and the protection layer are separate layers.

13. A method for manufacturing a display screen, the method comprising:
forming a reflective layer on a light-exiting surface of a Fresnel lens layer to reflect image light incident from a projector;
forming a primer on a light-incident surface of the Fresnel lens layer;
forming a protection layer on the primer;
forming an embossed pattern on one surface of the protection layer;
forming a light diffusion layer on the protection layer; and
forming a surface reflection reducing layer on the light diffusion layer, wherein the primer is formed between the light-incident surface of the Fresnel lens layer and the protection layer to bond the protection layer and the Fresnel lens layer, and
wherein the primer has a predetermined thickness less than a thickness of the protection layer and is configured to reduce a phase difference between the Fresnel lens layer and the protection layer.

14. The method of claim 13, wherein, in the step of forming a protection layer, the protection layer comprises one of PMMA (polymethyl methacrylate), PVA (polyvinyl acetate), COP (cyclo polyolefin), COC (cyclo olefin copolymer), TAC (triacetyl cellulose), and PC (polycarbonate).

15. The method of claim 13, further comprising the step of including a black pigment in the protection layer.

16. The method of claim 13, further comprising the step of including a black material in the Fresnel lens layer.

17. The method of claim 13, wherein, in the step of forming the embossed pattern, the embossed pattern is formed to reduce phase difference between the Fresnel lens layer and the protection layer.

18. The method of claim 13, wherein, in the step of forming the primer, the primer is formed between the Fresnel lens layer and the protection layer to reduce phase difference between the Fresnel lens layer and the protection layer.

19. The method of claim 13, wherein a coloring agent is added to the protection layer.

20. The method of claim 13, wherein the light diffusion layer is a lenticular lens layer.

21. The method of claim 13, wherein the primer is a non-aqueous primer.

22. The method of claim 13, wherein the light diffusion layer and the protection layer are separate layers.

* * * * *